March 24, 1959　　　　R. H. HOGE　　　　2,878,832
VALVE APPARATUS AND CONTROLS
Filed March 7, 1956　　　　　　　　　　2 Sheets-Sheet 1

INVENTOR.
Robert H. Hoge
BY Harry R. Canfield
　　Attorney

March 24, 1959  R. H. HOGE  2,878,832
VALVE APPARATUS AND CONTROLS
Filed March 7, 1956  2 Sheets-Sheet 2

INVENTOR.
Robert H. Hoge
BY Harry P. Canfield
Attorney

2,878,832

VALVE APPARATUS AND CONTROLS

Robert H. Hoge, Gates Mills, Ohio, assignor to The Clarke Controller Company, Cleveland, Ohio, a corporation of Ohio Application March 7, 1956, Serial No. 570,050

7 Claims. (Cl. 137—620)

This invention relates to valve apparatus of the class in which valves are operated to supply fluid under pressure from a source to an apparatus to be served or operated; and are restored to cut off or exhaust the supply of pressure; and in which the valves thus operate and restore in response to control signals transmitted thereto.

In the various arts, the apparatus to be pressure-served by valve apparatus of this class is often of such nature that the valve apparatus when signalled, to operate or to restore as referred to, must do so infallibly, and therefore safely, because otherwise damage to the pressure-served apparatus or injury to personnel attending it may result.

An illustrative example of such a pressure-served apparatus is a cyclically operating motor driven machine having a clutch and brake, operated to engage the clutch and release the brake to start the machine, and to release the clutch and set the brake to stop it, by reciprocations of a piston in a cylinder, when pressure is respectively applied to and exhausted from the cylinder; and an air valve device is operated and restored, respectively, to communicate air pressure to and exhaust it from the cylinder, in response to signals to the device from a manual or machine operated control.

In such an example it is particularly important that the valve device shall exhaust the cylinder to stop the machine when signalled to do so, to be safe as referred to.

Controls for the valve devices of such machines for the purposes mentioned have been developed to a high degree of safety, illustrative of which is the power press control described in U. S. Patent No. 2,133,161 and valve devices per se comprising valves operable to admit air pressure to and exhaust it from a cylinder adaptable to such machines have been developed that operate responsive to control signals with a high degree of infallibility, illustrative of such valve devices being that described in the copending patent application of Jan R. Ohlsson, Serial Number 417,795, filed March 22, 1954 (assigned to the instant assignee).

It is known however that such valve devices, no matter how infallible they may be in responding to actuating signals when first made and installed, are, in use, subject to deterioration from wear and tear, mechanical fatigue of materials, infrequent or careless inspection and maintenance, etc. and after a period of use the reliability and safety features carefully built into them are no longer sufficient to prevent faulty operation or failure of signal response, and they cease to be completely safe in the respects above noted.

An object of the invention is to provide a valve apparatus adaptable for use with control systems that have been developed to a high degree of safety in operation as referred to, and which valve apparatus will have as high a degree of infallibility and safety as the control systems.

Another object is to provide a valve apparatus for supplying pressure to a served apparatus and for cutting off or exhausting the pressure from the apparatus, which when signalled so to do by a control, will do so with a degree of reliability and infallibility nearer to absolute infallibility than has heretofore been possible.

The invention is applicable to various uses in the several arts. Since its use to serve the clutch and brake air cylinder of a cyclically operating press as referred to, is one of its more important uses, and in order to describe herein concretely at least one of its uses, as required by law, it has been chosen to describe it herein as supplying air under pressure to an air cylinder and piston servo device, and exhausting it therefrom.

The invention may be embodied in various forms, but in the form described herein it comprises, in general, two valve devices adapted to be connected in series between a supply source of air pressure and the said air cylinder. The valve devices each comprise valve ports; and respective valves reciprocable to two positions; which may be referred to as effecting an "on" condition and an "exhaust" condition of the devices. With both devices in the on-condition, air flows from the source through both valve devices in series to the air cylinder. If either device goes from the on-condition to the exhaust condition, it exhausts air from the cylinder.

Normally, a first one of the valve devices is always maintained in the on-condition; and the second one is operated alternately to on-condition and exhaust-condition to supply pressure to and exhaust it from the air cylinder when signalled to do so by a control, preferably electromagnetic.

If because of the development of a fault or failure to perform its function the said second valve device fails to go to exhaust condition when signalled so to do, the first device is automatically caused to go to exhaust-condition and exhaust the cylinder; and is thereafter maintained in exhaust-condition until the second device is replaced or repaired to correct the fault or failure.

The valves of both devices are reciprocable as referred to by diaphragms connected to them and by the difference of effective air pressures communicated to opposite sides of the diaphragms.

To move the first valve device to, and normally hold it continuously in on-condition as referred to, pressure from the source is communicated to one side of its diaphragm, and pressure is exhausted from the other side; and when, in the event of any fault or failure, the second valve device fails to go to exhaust-condition, pressure is automatically communicated to the said other side of the diaphragm of the first device in a manner to cause it to move the valve device to and hold it in exhaust-condition.

The means by which the first valve device is held normally in on-condition and is caused to go to exhaust-condition upon failure of the second valve device to do so on signal, comprises operating parts which perform functions that insure certain and stable functioning of the first device, thus multiplying the safety provided for by the first device; and in the event that said operating parts should fail to perform their functions, means is provided by which the first valve device is rendered responsive to such failure and goes to exhaust-condition.

Another object of the invention is to provide a valve apparatus having the features and characteristics of operation set forth in the foregoing general description.

From the foregoing, it will be seen that the said first valve device, by being maintained always in on-condition during normal on and exhaust operations of the second valve device, is not subjected to wear and tear and deterioration, so that when called upon to go to exhaust-condition will be in effect a fresh new valve device and will therefore safely perform.

It is therefore another object of the invention to provide generally a valve apparatus having two valve devices in series between a source of pressure and an apparatus to be served, a first one of which is normally maintained in an air flow or on-condition and the second of which is alternately operable to an on-condition to supply air pressure to a served apparatus and to an exhaust-condition to exhaust the apparatus in response to signals communicated thereto; both valve devices being operable to go to on-condition or to exhaust-condition by a difference of air pressure applied thereto, and the first device automatically going to exhaust-condition upon failure of the second one to do so in response to signal.

Another object is to provide a control for the two valve devices, operable to cause the devices to respond to signals in the manner referred to, and which control will automatically cause the first device to go to exhaust-condition upon the occurrence of fault or failure of function in the control itself.

An illustrative embodiment of the invention is fully disclosed in the following description taken in connection with the accompanying drawing.

The actual invention is that set forth in the appended claims.

In the drawing:

Figs. 2 to 6 are views showing, separately, a valve spool of Fig. 1, of which:

Fig. 2 is a top plan view;

Fig. 3 is an elevational view in the direction of the arrow 3 of Fig. 2;

Fig. 4 is a sectional view from the plane 4—4 of Fig. 2;

Fig. 5 is an elevational view in the direction of the arrow 5 of Fig. 3; and

Fig. 6 is a sectional view from the plane 6—6 of Fig. 2.

Figure 1:
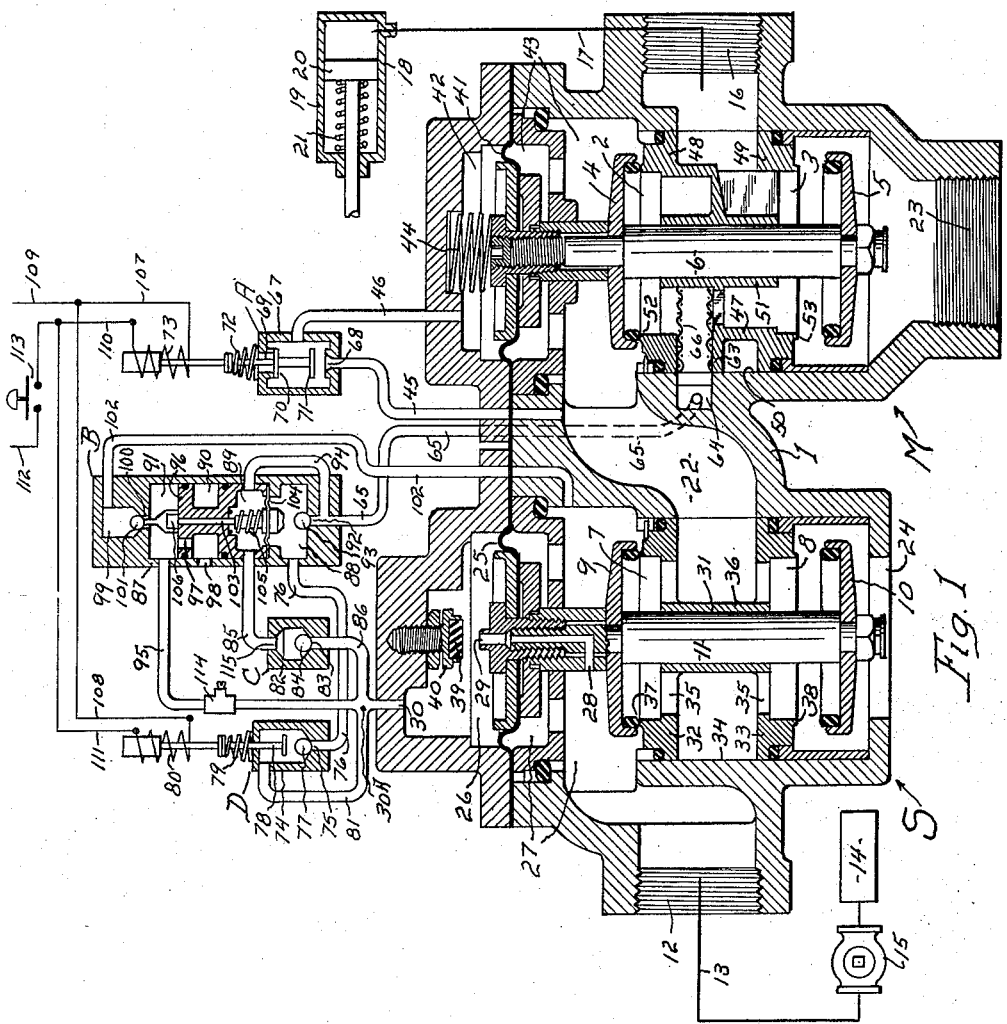
Fig. 1 is a view, partly diagrammatic, illustrating the embodiment of the invention.
Figure 2:
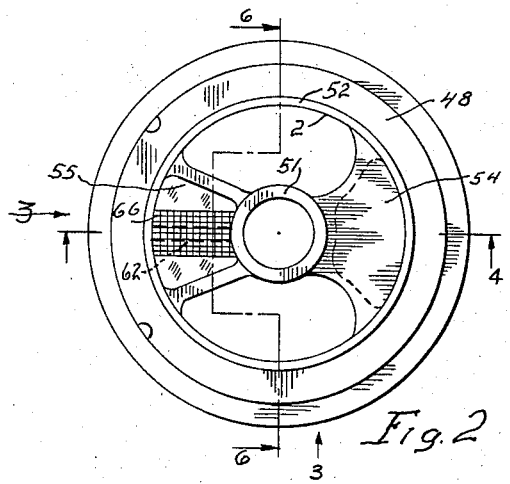
Figure 3:
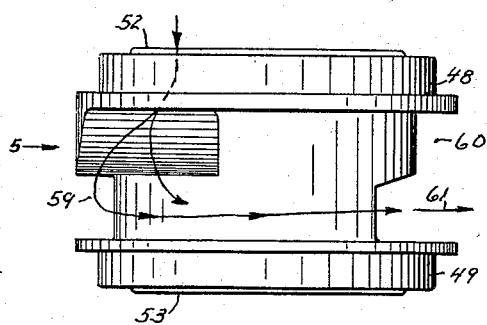

Referring to the drawing Figure 1, there is shown at 1 a valve housing, preferably of cast metal, in which is a main valve device M and a safety or protector valve device S.

The valve device M, in the position of use illustrated, has upper and lower valve ports, 2 and 3, and corresponding valves 4 and 5 therefor, connected by a valve stem 6.

The valves in operation to be described, move to the down position illustrated, closing the port 2 and opening the port 3; or move to an up position to close the port 3 and open the port 2.

The valve device S, similarly, has upper and lower valve ports, 7 and 8, and valves 9 and 10 connected by a valve stem 11, and in operation move to the down position illustrated, closing port 7 and opening port 8, and to an up position to close port 8 and open port 7.

The housing 1 has an inlet 12, threaded to be conduit-connected, as indicated by the line 13, to a source 14 of air pressure, through a manually operable supply valve 15; and the housing has an outlet 16, threaded to be conduit-connected, as indicated by the line 17, to an apparatus 18 to be served by air pressure; and which, for illustrative purposes, is the brake cylinder 19 of a power press as referred to hereinbefore, containing a piston 20 which is moved forwardly by air pressure applied to the cylinder behind it, from the line 17, to release the press brake, and returned by a spring 21, to set the brake, upon interruption of the applied pressure.

The valve devices S and M are in series in the order named, between the pressure source 14 and the apparatus 18; and when the valves of both devices are in the up positions, which will be referred to as the "on" condition, air pressure goes from the inlet 12, by way of port 7, through a connecting passageway 22, by port 2, to outlet 16 and to the apparatus; and when the valves of either device M or S, are in the down position, which will be referred to as the "exhaust" condition, air at the apparatus 18 may exhaust therefrom; the exhaust at the device M being back through the line 17, and outlet 16, and through port 3, through an exhaust outlet 23, to atmosphere; and if the valves of the device M are in the up position at the time and the valves of the device S alone are in the down position, exhaust occurs at the device S, back by way of the outlet 16, valve port 2, passageway 22, port 8, through an exhaust outlet 24 to atmosphere.

In view of the premises, the valves 9 and 10 of the valve device S are normally in the up position or on condition at all times, and the valves 4 and 5 of the device M are operated up and down, repeatedly, to apply pressure to the apparatus 18 and exhaust it therefrom; and if the device M should fail to exhaust, the valves 9 and 10 of device S will go to the down position and effect exhaust from the apparatus 18.

The operating means for operating the valves to this end will now be described; and as will appear, if said operating means itself should fail to function as intended, the device S will go to exhaust condition, with the valves 9 and 10 down, and the valve 9 will cut off supply pressure at the port 7, and the apparatus 18 will exhaust.

In the device S, the valve stem 11 is connected to a diaphragm 25, which divides a part of the main housing 1 into upper and lower pressure chambers, 26 and 27. The source pressure entering at the inlet 12 is communicated to the upper side of the valve 9 and to the lower chamber 27 as is apparent in the drawing.

A duct 28 extends laterally into the stem near the top of the valve 9 and goes axially upward through the stem to a duct outlet 29 at the top of the stem above the diaphragm.

The upper chamber 26 is closed except for a duct 30 leading from it.

A valve spool 31, has annular spaced apart heads 32—33 fitted in a bore 34 of the housing, connected by spokes 35—35 to an axial tubular guide 36 in which the stem 11 is guided; and the annular form of the heads 32—33 provides the valve ports 7—8 and annular valve seats 37—38 thereon.

Axially aligned with the stem 11 and immediately above it, is a cushioning pad 39, mounted on a support 40, threaded into the main housing for axial adjustment, and when the valves 9 and 10 move up and the valve 10 seats upon its seat 38, the outlet 29 under the pad 39 comes into sealing engagement with the pad and closes the duct 28.

In the device M, the valve stem 6 is connected to a diaphragm 41, which divides a part of the main housing into upper and lower pressure chambers 42—43.

Pressure in the passageway 22 from the source 14 will be communicated to the lower chamber 43 and to the upper side of the valve 4 when the device S is on condition, as is apparent in the drawing.

A spring 44 in the upper chamber 42 reacts to tend to move the valves 4—5 to down positions.

A conduit 45 leads from the chamber 43, and a conduit 46 leads from the chamber 42.

A valve spool 47 has annular spaced heads 48—49 fitted in a bore 50 of the housing and an axial tubular guide 51 in which the stem 6 is guided. The annular form of the heads 48—49 provides the valve ports 2—3, and annular valve seats 52—53.

The spool 47 is shown separately in Figs. 2 to 6, to which reference is here made, in connection with Fig. 1.

The guide 51 is connected to the annular heads 48—49 by spoke portions 54—55, formed to provide the following air passages through the spool, from the chamber 43 to the outlet 16, when the valves 4—5 are in the up position.

Figure 4:
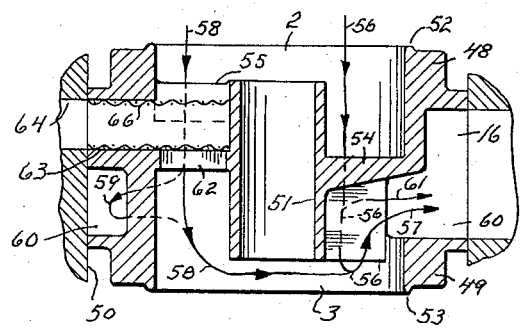

Air flowing downwardly through the port 2, flows downwardly around the sides of the spoke portion 54 as indicated by arrow 56, Fig. 4 and thence toward the outlet 16 as at the arrow 57; and air flowing downwardly through the port 2 also flows downwardly around the sides of the spoke portion 55 as indicated by arrow 58 and under the guide 51 and out at arrows 56—57.

Figure 5:
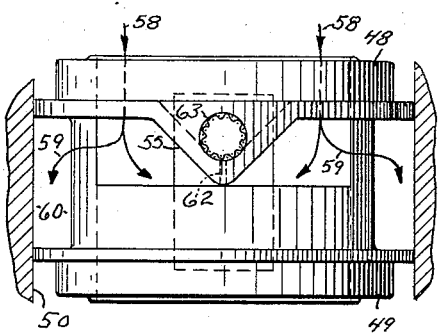
Figure 6:
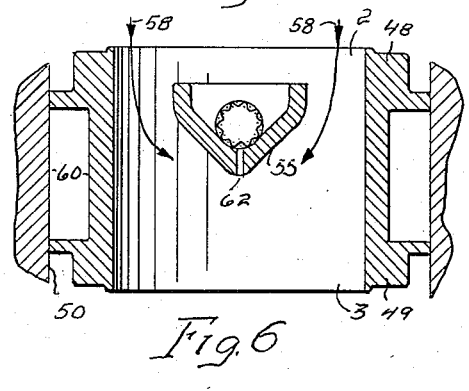

Downward air as by arrows 58—58 Figs. 4 and 5, also flows around the spoke portion 55 and as by arrows 59 flows into an annular passage 60 between the heads 48—49 and thence out as by arrow 61.

Upon return of exhaust air from the outlet 16 as described, and with the valves 4—5 in their down positions, air enters the annular passageway 60 and flows backward on the path indicated by arrows 57—56 and down and out at the port 3; and also flows around the annular passage 60 backward on the path indicated by arrows 61—59 and then downwardly along the outside of spoke portion 55 and shown by arrow 58 and out at port 3.

The spoke portion 55 is in the form of a wall of downwardly tapering V-section and upwardly open. Through the apex of the V is a slot 62. Air flowing downwardly as by arrows 58, flows over the outside of this V form wall, and draws air downwardly out of it through the slot 62, creating a partial vacuum in it.

This will occur when the valves 4 and 5 are in their down positions, and air is flowing from the outlet 16 through valve spool to the outlet 23.

The interior of the V form wall communicates with a horizontal bore 63 in the wall of the spool, aligned with a pocket 64, in the housing, Figs. 1 and 4. A conduit 65 leads from the pocket 64. The said partial vacuum is communicated to the conduit 65, and rapidly exhausts any air therein, out through the slot 62, and creating partial vacuum in the conduit 65.

Preferably a tubular air screen 66 is inserted in the bore 63 and extends into the upper open top of the V-form wall.

At A, B, C and D are devices constituting part of the means for operating the valve devices S and M in the manner referred to.

These devices, in practice, may be assembled with the main housing 1, and certain conduits thereof may then take the form of ducts; but to simplify this disclosure, these devices are shown separately in the drawing, and will now be described.

The device A is an electromagnetic valve device. It comprises a walled housing 67; an air inlet valve port 68 in the housing wall with which the said conduit 45 communicates; an exhaust port 69 from the housing; valves 70 and 71 connected to reciprocate up and down in unison, and normally held up by a spring 72 to close the port 69 and open the port 68, and movable down to open the port 69 and close the port 68 by an electromagnet 73.

The conduit 46 communicates with the interior of the housing 67.

The device D is an electromagnetic valve device. It comprises a walled housing 74; an inlet port 75 through the housing wall with which a conduit 76 communicates; a ball check valve 77 normally closing the port by gravity; a valve plunger 78, having its lower end held normally above the ball 77 by a spring 79 to allow the ball to be raised by pressure in the conduit 76, and movable downwardly to press the ball on its seat 75 to prevent pressure from raising it, by an electromagnet 80.

A conduit 81 connects the housing interior with the said duct 30 at a conduit junction 30A.

The device C is a check valve. It comprises a walled housing 82; an inlet port 83 through the housing wall; a ball check valve 84 normally closing the port 83 by gravity; a normally open port 115; an exhaust conduit 85 leading from the housing interior through the port 115; and a conduit 86 connecting the port 83 to the conduit junction 30A.

The device B is an air operated valve device. It comprises a walled housing 87, divided into four chambers, 88, 89, 90, 91. The chamber 88 has a valve port 92 normally closed by a gravity ball check valve 93, and the said conduit 65 communicates with the port 92 to raise the ball and open the port by pressure in the conduit.

The said conduit 76 communicates with the chamber 88.

A conduit 94 connects the chamber 89 with the conduit 65 at a point below the port 92.

The said conduit 85 is connected to the chamber 89.

A conduit 95 connects the chamber 91 with the conduit junction 30A.

A wall 96 is provided between the chambers 91 and 90, and has an orifice 97 connecting the chambers 91 and 90, and an outlet 98 through the housing wall effects communication from the chamber 90 to atmosphere.

In the upper end of the housing is a check valve chamber 99 having a port 100 communicating with the chamber 91 and a gravity ball check valve 101 normally closes the port 100.

A conduit 102 connects the valve chamber 99 with the lower chamber 27 of the valve device S.

The chambers 88—89 are separated by a diaphragm 104. A plunger 103 is connected to the diaphragm and is normally held down by a spring 105, and extends up through the wall 96 and carries a head 106, stopped downwardly against tension of the spring by the wall 96, and the head has a pointed end just below the ball 101 by which when the plunger is raised by the diaphragm as will be described the ball 101 will be lifted to open the port 100.

The electromagnets 73 and 80 have their windings both connected at one side by wires 107 and 108 to one current supply line 109, and the other side connected by wires 110—111 to the other current supply line 112, through a contactor 113, shown as an operator's push button contactor.

*Normal operation*

The normal operation of the invention is described in the following description, simplified by reference to the premises in which the end results sought to be attained have already been set forth.

The parts of Fig. 1 are illustrated in their out-of-use positions, with the air supply valve 15 closed.

Upon opening the supply valve 15, air pressure flows to the lower chamber 27 of device S and acting on the diaphragm 25 raises it; and concurrently, the upper chamber 26 exhausts by one path by way of duct 30 and conduit 95; and thence, at the device B, through chamber 91, orifice 97, and outlet orifice 98. This exhaust path will be referred to in connection with the fact that it is always open.

Exhaust also occurs by another path from upper chamber 26 by way of duct 30 to conduit 86, through port 83 of device C, raising the check ball 84, and by conduit 85; and thence, at device B, through chamber 89, and thence through open port 115, to conduits 94 and 65 to the interior of the spool 47 of device M, and out at exhaust port 3.

While the diaphragm 25 and valve stem 11 are moving upwardly, air from the source in chamber 27 can flow through the stem duct 28 and from duct outlet 29 into chamber 26; but the total exhaust from chamber 26 by the two paths just described is substantially equal to the rate of supply to the chamber by the duct 28, this being effected by making the orifice 98 of device B of a suitably restricted size; or by making the effective size of the conduit 95 adjustable by an adjusting valve 114, and this prevents accumulation of pressure in the chamber 26.

The rising diaphragm 25 raises the stem 11 and valves 9—10 of device S to their up positions, and air pressure flows through upper port 7 to passageway 22.

At device S, when the stem 11 has moved all the way up, the duct outlet 29 at its upper end becomes closed and sealed on the pad 39; whereby pressure flow through the stem duct 28 is cut off, and chamber 26 becomes fully exhausted, and valve device S is held firmly in up condition by source pressure in lower chamber 27; and will remain in this condition until and unless pressure is communicated to the upper chamber 26, which occurs, as will be described, upon abnormal operation of device M or of control devices A and D.

In any such exent, pressure in chamber 26 will be more effective on the diaphragm 25 than that in chamber 27, due to the different areas of the diaphragm subjected to the pressure, as is apparent from the drawing, and the pressure in the chamber 27 will act downwardly on the valve 9 and supplement the pressure in the chamber 26, so that the diaphragm 25 will restore the device S to down condition, and exhaust the served apparatus 18 as described.

At the device M at this time, the lower chamber 43 is subjected to source pressure coming from the passageway 22, and the upper chamber 42 is also subjected to source pressure by way of conduit 45, open valve port 68, and conduit 46. Pressure in chamber 42 is more effective on the diaphragm 41 than that in chamber 43, due to the difference of diaphragm area subjected to pressure, and the pressure in chamber 43 acts downwardly on the valve 4 and supplements the pressure in chamber 42, so that the diaphragm 41 and stem 6 and valve 4 are held down, holding port 2 closed. This is aided further by spring 44.

The parts as a whole are now in ready-for-use condition, with device S in up condition and device M in down condition.

To cause the valve device M to give pressure to, and exhaust pressure from, the apparatus 18, repeatedly, as in the premises, the windings of the electromagnetic valve devices, A and D, are repeatedly, simultaneously, energized and de-energized. This, in the simplified showing of Fig. 1 is done by closing and opening the contact 113.

Device A when energized, operates closing valve port 68, and opening exhaust port 69.

Device D when energized, operates holding the ball check valve 77 down holding port 75 closed.

When device A operates, the upper chamber 42 of device M exhausts by conduit 46 and exhaust port 69; leaving the diaphragm 41 exposed to supply pressure in the chamber 43, and it moves up, raising the valve stem 6 and the valves 4 and 5, closing exhaust port 3 and opening port 2, and full supply pressure goes by outlet 16 to the apparatus 18.

Supply pressure in the valve spool 47 goes to the conduit 65, but effects nothing, since it is blocked off by the check ball 84 of device C, as is apparent from the drawing and by check ball 77 held down by the magnet 80. Also pressure in conduit 65 communicated to chamber 88 of device B below the diaphragm 104 cannot operate it by lifting the ball 93 and raising the diaphragm, because the chamber 89 above the diaphragm is also subjected to pressure from conduit 65 by conduit 94, and the diaphragm is further held down by spring 105.

Upon de-energizing the devices A and D, the parts are restored to the ready-for-use condition, with the valves 4 and 5 of device M in the down position, opening exhaust port 3 and closing port 2, and the apparatus 8 exhausts back by outlet 16 and exhaust outlet 23.

When the apparatus 18 is exhausting, air flows down over the outside of the V-shaped spoke portion 55 and creates a partial vacuum therein, as previously described. This causes the air pressure in conduit 65, conduit 94, chamber 89, conduit 85, and the interior of the device C, to be exhausted very rapidly downwardly through the V-shaped portion 55 and out at the slot 62 thereof to exhaust port 3.

The air pressure in chamber 88 and conduit 76 cannot exhaust through this path because of the ball check valve 93 holding port 92 closed.

However, since the device D is de-energized, the ball check valve 77 will be raised by the pressure in conduit 76; and the air in conduit 76 and chamber 88 will flow through port 75, and the interior of housing 74, and conduit 81 to the point 30A. From point 30A, air can flow in three directions.

The first is through conduit 95, chamber 91, duct 97, to chamber 90, and is exhausted therefrom through port 98 to atmosphere.

The second is through conduit 86, port 83, raising the ball check valve 84, conduit 85, chamber 89, conduit 94, conduit 65, to the valve device M, and there exhausting out through port 3 to atmosphere.

The third is through conduit 30 to chamber 26 of the valve device S.

The air thus flowing into chamber 26 is not enough to cause the diaphragm 25 and valve stem 11 to move down, because of its small initial quantity, and because air is being exhausted through the other two exhaust paths.

*Provisions insuring safe operation*

As set forth in the premises, for safe operation, the apparatus 18 must exhaust infallibly, when the valve apparatus is signalled to exhaust by opening the contactor 113 as described.

This exhaust will normally be effected at the valve device M as described, but if it should fail to exhaust, the valve device S will do so; and devices A—B—C—D are incorporated in the system of Fig. 1 to insure that valve devices M and S will perform as intended.

In the following are described faults which possibly can develop in the embodiment of Fig. 1, and the failure of functions thereof; and how they are automatically prevented from causing unsafe operation of the served apparatus 18, by preventing supply of pressure to the apparatus in the first instance, or by causing the served apparatus to exhaust and thereby go to safe condition in spite of such faults or failure, and to remain in exhaust condition, until the fault is corrected.

If the device S should fail to go to its normal or up condition when pressure is admitted by initial opening of supply valve 15, safety is obviously inherent.

Again, when the valve device M is signalled to go to up condition by closing contactor 113 to admit pressure to the served apparatus 18; if then, due to any fault or failure of any part, such as the magnet 73, valve device A, diaphragm 41 etc., the device M does not respond to the signal, it will remain in down condition, keeping the apparatus 18 exhausted, and safety will here also be inherent.

Again, upon the closing of contactor 113 and the operation of valve devices A and D as described, the valve device M may go to up condition and supply pressure to the apparatus 18, when signalled to do so; but when signalled to go to down condition and exhaust the apparatus 18, upon the opening of contactor 113 and restoring of devices A and D, it may fail to do so.

In view of the premises, this failure of the device M will be recognized as the most dangerous of all possible failures.

In such event, the device S will then, as described below go to down condition, exhausting the apparatus 18 back through the open port 2 of device M, passageway 22, valve port 8 of device S, and out at outlet 24 as will now be described.

With device M in up condition, and valve port 2 open, the conduit 65 will be subjected to pressure, and the pressure going to device B will raise its check ball 93 and subject the chamber 88 and conduit 76 to pressure.

The device D being restored up, the check ball 77 will not be held down, and the pressure in conduit 76 will raise the ball 77 and go through the port 75 to conduit 81 and thence through the junction 30A to duct 30 and into the upper chamber 26 of device S.

This pressure in upper chamber 26 may be less than full source pressure, but is more effective on the diaphragm 25 than the source pressure in chamber 27 below it, due to effective area difference, as referred to, and the stem 11 and valves 9—10 start to move down.

This breaks the seal at duct outlet 29 at the top of the stem 11, and immediately source pressure flows upwardly through the duct 28 into chamber 26, giving full source pressure thereto which causes the diaphragm 25 and stem 11 to move downwardly with quick positive action; thus restoring device S to down condition and effecting exhaust of the apparatus 18 as described.

When device S has operated to its down condition, it will remain in this condition as long as it is connected to the source 14, by conduit 13, because the air flowing through duct 28 into chamber 26 is sufficient to replace the air that is exhausted through the aforedescribed two exhaust paths, namely by conduit 95, and by conduits 86, 85, 94 and 65. Thus, sufficient pressure is maintained in chamber 26 to hold device S permanently in its down condition.

To operate the device S to its up condition for further normal operation of the system, manual valve 15 must be turned off to exhaust the entire system, then when turned on again, device S will go to its up condition, as previously described. If the fault here considered has not been corrected before returning manual valve 15 to its on position, device S will again go to down condition in the same manner as described. This makes it compulsory to correct the fault or failure before operation can be resumed.

Again, when contactor 113 is closed to signal device M to go to up condition to give pressure to the apparatus 18, valve devices A and D should both operate simultaneously. Device D may operate but device A may fail to operate.

In this event, device M will remain in down condition and safety will be inherent.

Again, when contactor 113 is closed, to operate both devices A and D, device A may operate but device D may fail to operate. Upon operation of device A, valve device M will go to up condition and give pressure to the apparatus 18. With port 2 open at device M, the conduit 65 is subjected to source pressure; and this pressure raises check ball 93 and is communicated to chamber 88 and conduit 76, raising ball 77, and thence to conduit 81 and by duct 30 to the upper chamber 26 of device S. Both chambers 26 and 27 of device S will then be subjected to pressure, and that in chamber 26 being on a greater effective area of the diaphragm 25 than that in chamber 27, the diaphragm moves down and puts valve device S in down condition, cutting off the source pressure and exhausting the apparatus 18 at outlet 24 as described.

The valve device A at this time may still be operated by the contactor 113. At the valve device M, pressure in chamber 43 is exhausted by device S as just described and can no longer hold device M in up condition, and the spring 44 will restore device M to down condition.

Upper chamber 26 of device S was under pressure when device S went to down condition. The chamber 26 now has said two exhaust paths by way of conduit 95, and conduits 86, 85, 94 and 65, pressure in the latter being now relieved; and pressure is being supplied to the chamber by duct 28.

Since the supply of pressure to the chamber 26 and its exhaust therefrom are at substantially equal rates as described, pressure is maintained in the chamber 26 and device S is maintained in down condition.

When contactor 113 is finally opened, then, both devices A and D will be unoperated, and devices S and M will both be in down condition. Device M cannot go to up condition again, because down condition of device S cuts off pressure in the passageway 22, and device S cannot go to up condition to give pressure to the passageway 22, because pressure persists in chamber 26 high enough to hold device S in down condition. The valve apparatus will therefore be shut down and the controlled apparatus 18 will be permanently exhausted.

To restore operation, the supply valve 15 must be closed for a short interval during which chamber 26 will fully exhaust, and then opened again to give pressure to the chamber 27.

Again, with device S in up condition, and device M in down condition, ready for operation, if devices A and D both fail to operate when signalling contactor 113 is closed, device M, with its diaphragm 41 subjected to equal pressures, due to failure of device A, will remain in down condition which is inherently safe.

Again, after closing contactor 113 and operating devices A and D, and with devices S and M in up condition, giving pressure to the apparatus 18, if upon opening contacts 113 device D restores but device A fails to restore, conduit 65 will be under pressure; and by means of pressure in conduit 65, chamber 88, conduit 76, port 75, and conduits 81 and 30, pressure develops in upper chamber 26 of device S, and it is thereby moved to down condition, and exhausts the apparatus 18 through its port 8.

This exhausts pressure from lower chamber 43 of device M and it goes to down condition.

Conduit 65 then loses its pressure; and since it was pressure in conduit 65 that made device S go to down condition, it may appear that device S would go to up condition again, restoring pressure in chamber 43 of device M, making it go to up condition again, and again put pressure in conduit 65, and that devices S and M would therefore go to up and down condition repeatedly; but this does not occur.

Although source pressure is still in the lower chamber 27 of device S, and further communication of pressure to the upper chamber 26 by conduit 65 has ceased, device S nevertheless will be maintained in down condition as follows.

It will be recalled that, at device S, when the supply valve 15 was first opened, and the lower chamber 27 was subjected to source pressure, there was no pressure in the upper chamber 26, and that pressure was communicated to it through the stem duct 28; and that the upper chamber 26 had two exhaust paths by way of conduit 95 and orifices 97 and 98, and by way of conduits 86, 85, 94 and 65 to atmosphere. These exhaust paths exhausted chamber 26 sufficiently to maintain a large drop of pressure from chamber 27 to chamber 26 which moved device S to up condition.

In the present instance, when device S goes to down condition, there is pressure in the upper chamber 26 communicated from conduit 65 as described. When pressure is now communicated from lower chamber 27 to upper chamber 26 by duct 28, there is only a small drop of pressure between the chambers because of pressure in the upper chamber. The two exhaust paths for the upper chamber are present and may carry away from the upper chamber air supplied to it by the stem duct 28, but pressure once established in the upper chamber persists, in spite of these exhausts and the said drop of pressure into it remains small and insufficient to raise the diaphragm 25 and move the device S to up condition.

Again, upon operation of both devices A and D, by closing contactor 113, and upon opening contactor 113 to restore them, device A may restore but device D may fail to restore, and valve device M will then go to down condition, due to restoring of device A, and will exhaust the apparatus 18. However it is not safe to leave device D in non-restoring condition, and its correction is made compulsory as follows.

Whenever exhaust occurs at device M, a pulse of partial vacuum is produced in the conduit 65 by the action of the V-shaped part in the spool of device M, as described.

This partial vacuum is communicated to the chamber 89 of device B by conduits 65 and 94.

In normal operation, when device D does restore, any pressure in the lower chamber 88 of device B, can expand into the upper chamber 89 by way of conduit 76, port 75, conduits 81 and 86, port 83 and conduit 85; so that both chambers 89 and 88 will come at once to the same pressure, and the diaphragm 104 of device B will remain unmoved.

If however, as here considered, device D has failed to restore, the ball 77 in device D will be held down holding port 75 closed, and such equalization of pressure in device B cannot occur; and the vacuum-reduced pressure in chamber 89 will be less than that in chamber 88, and the diaphragm 104 will be moved upwardly, raising ball valve 101 at the top of device B, as described.

Thereupon, source pressure from lower chamber 27 of device S will flow by conduit 102 to chamber 99 of device B and thence by open port 100 to conduit 95, and to duct 30 and upper chamber 26 of device S, putting both the upper and lower chamber of device S at source pressure. Device S will therefore go to down condition, cutting off supply pressure, and device S will be maintained in down condition, for reasons already explained.

That is, if there be no pressure in upper chamber 26, communication of pressure to it through duct 28 will be kept exhausted therefrom by said two exhaust paths by conduits 95 and 65. There will be a large drop of pressure between the lower and upper chambers and device S will be moved to up condition. But if, as here, pressure in the upper chamber is once established, then the drop of pressure between the chambers will be small, in spite of the exhausts from the upper chamber, and the device S will not be moved to up condition.

It is to be recalled, collaterally, that every time exhaust occurs at the device M, the device B receives the said pulse of partial vacuum. Nothing is caused to happen thereby if valve device D is performing normally; but if not then the above described action of moving valve device S to down condition occurs. Thus the device B in a real sense tests the operative condition of device D, at each exhaust operation of the valve device M.

One of the results of producing the partial vacuum impulse in the conduit 65 as described, when the parts are operating normally, is to cause a quick release of pressure in the conduit 65. This gives positiveness or stability to the operations. If any event occurs during otherwise normal operation to prevent the production of the partial vacuum impulse, stability is impaired. One such event would be that when the devices A and D have restored and the device M goes to down condition, the valves 4 and 5 may not go all the way down, due to extraneous matter, such for example, as a chip of metal lodged between the valve 4 and its valve seat 52, leaving a thin open space under the valve 4.

In such event, air under pressure may flow through the thin space under the valve 4 and downwardly into the inside of the V-shaped portion 55 of the spool 47 and thence to the conduit 65 and thence by chamber 88 of device B, conduit 76, port 75, conduit 81 and duct 30, to upper chamber 26 of device S, causing device S to go to down condition and cut off the source pressure. Port 3 of device M is substantially open, due to the said chip under the valve 2 and the pressure in apparatus 18 will exhaust through it. Thus, an unsafe condition will not exist; but if the chip is not removed, the valve 2 would be damaged by repeat operations, and would develop an unsafe condition. To inform the operator of this event, device S is made to go to down condition as described.

In the foregoing description, the upper chamber 26 of device S is described as having two exhaust paths, one through device C upon raising ball valve 84 and the other through restricted conduit 95.

If due to any cause, or in any circumstance of operation, the path of the exhaust through device S should become excessive, it may be desirable to cut off this path of exhaust. This may be done by providing an outlet port 115 from the device C to the conduit 85. Excessive flow from the conduit 86 will propel the ball 84 high enough from the port 83 to cause it to close the port 115 and hold it closed.

In some cases it may be desirable to omit the springs 72 and 79 from the respective devices A and D. The ports 68 and 75 would then be normally held closed by gravity of the moving parts, and opened by pressure in the ports 68 and 75, and held closed against the pressure upon energization of the windings 73 and 80.

The invention is not limited to the exact or particular embodiment illustrated and described. Changes and modifications may be made.

For example, the signalling circuit for the magnets 73 and 80 is shown as energized and de-energized by an operator's contactor of the pushbutton type; but the signalling circuit may be controlled in other ways, for example as shown in the aforesaid patent, for controlling a valve magnet.

The invention comprehends all changes and modifications which can be made by those skilled in the art without the exercise of invention and which come within the scope of the appended claims.

The subject matter hereof may be considered as embodying improvements over that of copending application Serial Number 490,080, filed February 23, 1955; and subject matter hereof not claimed herein is being claimed in said application.

I claim:

1. A valve device comprising a walled housing, having a generally cylindrical bore therein; the housing walls formed to provide an air pressure chamber at one end of the bore, and end outlet from the other end of the bore, and a side opening from an intermediate part of the bore; a one piece valve spool in the bore, comprising opposite axially spaced annular heads with annular valve seats thereon providing first and second valve ports communicating with the air chamber and end outlet respectively; and comprising an axially extending generally tubular side wall connecting the heads; and comprising axially spaced circular flanges of larger diameter than the side wall fitted in the housing bore, providing an annular passageway within the housing bore around the outside of the tubular side wall and communicating with the side opening; and comprising a generally tubular axially extending valve stem guide inside of the tubular wall, connected to the side wall and heads by connecting wall portions; the connecting wall portions formed to provide a V-form walled pocket open toward the first port and having side walls converging to an apex toward the second port, and an open orifice in the apex; a recess in the bore wall opposite the pocket and an aperture communicating between the recess and the pocket interior; the said connecting wall portions formed to provide air flow paths between the annular passageway and both ports, and from the first port to the pocket interior, and from the annular passageway over the outside of the pocket toward the said second port.

2. A valve device comprising a walled housing formed to provide a generally cylindrical bore communicating at one end with a fluid pressure chamber, and at the other end with an end outlet and at an intermediate portion with a side outlet; a valve spool comprising axially spaced flanges fitted in the bore at opposite sides of the side outlet and a generally tubular wall between the flanges of smaller diameter than the flanges providing an annular passageway around the outside of the tubular wall communicating with the side outlet; the spool, axially outward of the flanges, having a first and second valve port communicating respectively between the inside of the tubular wall and the pressure chamber, and between the inside of the tubular wall and the end outlet; an opening in the tubular side wall effecting communication between the annular passageway and both ports; a V-form pocket having side walls converging toward the second port and an aperture through the apex of the V-form, and the pocket being open toward the first port; an opening in the tubular side wall effecting communication between the annular passageway and the outside of the pocket walls; a recess in the cylindrical bore; a walled opening effecting sealed communication between the pocket interior and the recess.

3. A valve device as described in claim 2 and in which a tubular guide is supported on the tubular side wall coaxially thereof; and a valve stem is reciprocably guided thereby carrying valves to close the second port and open the first port to cause fluid to flow from the pressure chamber through the first port and out at the side outlet, or to open the second port and close the first port to provide a back flow path in at the side outlet, and over the walls of the pocket and out at the end outlet and to create partial vacuum in the pocket and in the housing recess.

4. In a valve device, a main walled housing formed to provide a fluid pressure chamber, a valve spool bore communicating at one end with the pressure chamber, and at the other end with an outlet from the housing, and at an axially intermediate part with a side outlet; a valve spool in the bore, comprising a first and second valve port at the ends of the bore, communicating respectively with the chamber and outlet; and a circumscribing annular passageway around the spool communicating with the side outlet; a pair of valves on a valve stem; a valve stem guide for guiding reciprocations of the valves and stem in unison to close the first port and open the second port and vice versa; means providing flow paths in the spool between the ports and the annular passageway; a V-form walled pocket open toward the first port and having outer walls converging toward the second port and an orifice in the apex of the V-form; and the exterior of the pocket walls disposed in the path of flow between the annular passageway and the second port; and means providing a flow path from the interior of the V-form to the exterior of the main housing.

5. In connection with a source of air under pressure and an apparatus served thereby, and valve apparatus controlling supplying of air pressure from the source to the served apparatus and exhausting it therefrom; the improvement in the art which comprises; a first and a second main valve device, each having an upper and a lower pressure chamber and a movable wall therebetween reciprocable up and down, and each having valve means connected to its movable wall to reciprocate up and down therewith, and port means for the valve means; the devices disposed in series between the source of air pressure and the served apparatus; each device having an air pressure inlet and outlet and an exhaust outlet; the devices being connected together and the valve and port means and pressure chambers being arranged so that upon up movement of both movable walls the devices are in so-called up condition and air may flow from the source in at the inlet of the first device and out at the outlet of the second device to the served apparatus, and so that upon down movement of the wall of either device the respective device is in so-called down condition and air from the served apparatus may flow in at the outlet of the second device and out through the exhaust outlet of the respective device; air pressure conducting means for subjecting the upper and lower chambers of the main valve devices to air pressure, differentially, to move the movable walls, and control means controlling the air pressure conducting means; the air pressure conducting means and control means comprising: a passageway for communicating source pressure to the lower chamber of the first main device; a duct communicating between the lower and upper chambers of the first main device and means cutting off said communication upon upward movement of the wall of the first main device; means for communicating source pressure to the lower chamber of the second device when the first device is in up condition; a first and a second conduit path both communicating with the upper chamber of the first main device, the first path being restricted and permanently open, and the second path leading to the second main device, through a first check valve normally gravity-closed, and arranged to be subjected to atmospheric pressure at the second main valve device when the latter is in down condition; and to be subjected to back pressure from the lower chamber of the second main valve device when the latter is in up condition with said back pressure blocked off by said first check valve; a first electromagnetic valve device conduit-connected with the upper and lower chambers of the second main valve device, and having a winding, and having valve and port means, and which when operated by the winding exhausts the upper chamber, and when restored connects the upper and lower chambers together; a second electromagnetic valve device comprising a winding and a port normally closed by a second gravity check valve, and which when operated by the winding holds the check valve on the port to keep it closed, and when restored releases the check valve; an electric circuit for energizing and de-energizing the windings to operate and restore the electromagnetic valve devices simultaneously; an air operated valve device comprising upper and lower chambers and a movable wall therebetween; the upper chamber being in said second conduit path, and the lower chamber being connected to said second conduit path through a third check valve normally gravity-closed; a conduit connection between the lower chamber of the air operated valve device and the port of the second electromagnetic valve device; a conduit connection between the first conduit path and the port of the second electromagnetic valve device blocked off by the second check valve, when it closes the port; a conduit connection between the lower chamber of the first main valve device and the said first conduit path through the port of a fourth check valve normally gravity-closed; a mechanical connection from the movable wall of the air operated valve device for opening the port of the fourth check valve upon upward movement of the movable wall; means at the second main valve device by which, when it moves to down condition and air enters the outlet of the second device from the served apparatus, a pulse of partial vacuum is communicated to the said second conduit path.

6. In connection with a source of air under pressure and an apparatus served thereby, and valve apparatus controlling supplying of air pressure from the source to the served apparatus and exhausting it therefrom; the improvement in the art which comprises; a first and a second main valve device, each having an upper and a lower pressure chamber and a movable wall therebetween reciprocable up and down, and each having valve means connected to its movable wall to reciprocate up and down therewith, and port means for the valve means; the devices disposed in series between the source of air pressure and the served apparatus; each device having an air pressure inlet and outlet and an exhaust outlet; the devices being connected together and the valve and port means and pressure chambers being arranged so that upon up movement of both movable walls the devices are in so-called up condition and air may flow from the source in at the inlet of the first device and out at the outlet of the second device to the served apparatus, and so that upon down movement of the wall of either device the respective device is in so-called down condition and air from the served apparatus may flow in at the outlet of the second device and out through the exhaust outlet of the respective device; air pressure conducting means for subjecting the upper and lower chambers of the main valve devices to air pressure, differentially, to move the movable walls, and control means controlling the air pressure conducting means; the air pressure conducting means and control means comprising: a first electromagnetic valve device conduit-connected to both chambers of the second main valve device, and having a winding and port means, and valve means operated, when the winding is energized, to exhaust the upper chamber of the main valve device and, when de-energized, to connect the upper and lower chambers together; a second electromagnetic valve device having a winding, and a valve port normally closed by a gravity check valve; and operable to hold the check valve down to hold the port closed when the winding is energized, and to release it to allow the port to open when the winding is de-energized; a conduit connection from the port, when open, to the upper chamber of the first main valve device; a control conduit subjected to the pressure in the lower chamber of the second main device when the latter is in up condition and communicating said pressure to the check valve of the second electromagnetic valve device in the direction to open its port; and electric circuit means for energizing both said windings simultaneously.

7. In connection with a source of air under pressure and an apparatus served thereby, and valve apparatus controlling supplying of air pressure from the source to the served apparatus and exhausting it therefrom; the improvement in the art which comprises; a first and a second main valve device, each having an upper and a lower pressure chamber and a movable wall therebetween reciprocable up and down, and each having valve means connected to its movable wall to reciprocate up and down therewith, and port means for the valve means; the devices disposed in series between the source of air pressure and the served apparatus; each device having an air pressure inlet and outlet and an exhaust outlet; the devices being connected together and the valve and port means and pressure chambers being arranged so that upon up movement of both movable walls the devices are in so-called up condition and air may flow from the source in at the inlet of the first device and out at the outlet of the second device to the served apparatus, and so that upon down movement of the wall of either device the respective device is in so-called down condition and air from the served apparatus may flow in at the outlet of the second device and out through the exhaust outlet of the respective device; air pressure conducting means for subjecting the upper and lower chambers of the main valve devices to air pressure, differentially, to move the movable walls, and control means controlling the air pressure conducting means; the air pressure conducting means and control means comprising: a first electromagnetic valve device conduit-connected to both chambers of the second main valve device, and having a winding and port means, and valve means operated, when the winding is energized, to exhaust the upper chamber of the main valve device and, when de-energized, to connect the upper and lower chambers together; a second electromagnetic valve device having a winding, and a valve port normally closed by a gravity check valve; and operable to hold the check valve down to hold the port closed when the winding is energized, and to release it to allow the port to open when the winding is de-energized; a conduit connection from the port, when open, to the upper chamber of the first main valve device; a control conduit subjected to the pressure in the lower chamber of the second main device when the latter is in up condition and communicating said pressure to the check valve of the second electromagnetic valve device in the direction to open its port; and electric circuit means for energizing both said windings simultaneously; an air operated valve device comprising an upper and a lower chamber and an upwardly movable wall between them, and conduit connections from the said control conduit to the upper chamber, and to the lower chamber through a normally closed gravity check valve; means subjecting the control conduit to a pulse of partial vacuum, at the second main valve device, when the latter goes to down condition; to cause the upwardly movable wall of the air operated valve device to move up, in the event that the check valve of the second electromagnetic valve device is held closed; a conduit connection between the lower and upper chamber of the first main valve device; through a normally closed valve and the upwardly movable wall, connected with the normally closed valve to open it by its upward movement.

References Cited in the file of this patent
UNITED STATES PATENTS

| | | |
|---|---|---|
| 2,636,581 | Bitler | Apr. 28, 1953 |
| 2,754,840 | Hicks | July 17, 1956 |